United States Patent
McIntosh et al.

(10) Patent No.: US 6,664,658 B2
(45) Date of Patent: Dec. 16, 2003

(54) POWER LIMITING SYSTEM AND METHOD IN A MULTIPLE POWER SOURCE ENVIRONMENT

(75) Inventors: Michael Philip McIntosh, Tucson, AZ (US); Fernando Quintana, Tucson, AZ (US); Charles Anthony Thompson, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 09/858,359

(22) Filed: May 14, 2001

(65) Prior Publication Data

US 2002/0167226 A1 Nov. 14, 2002

(51) Int. Cl.$^7$ .................................................. H02J 1/00
(52) U.S. Cl. ..................................... 307/62; 700/292
(58) Field of Search .................. 307/62, 30, 36, 307/42, 20, 24, 64; 700/292

(56) References Cited

U.S. PATENT DOCUMENTS

| | | | | |
|---|---|---|---|---|
| 3,723,841 A | * | 3/1973 | Cotton et al. | 318/574 |
| 3,823,342 A | * | 7/1974 | Burr et al. | 361/33 |
| 4,459,491 A | | 7/1984 | Ziegler | 307/64 |
| 4,796,152 A | * | 1/1989 | Sinden et al. | 73/852 |
| 4,972,277 A | * | 11/1990 | Sills et al. | 360/92 |
| 5,623,596 A | | 4/1997 | Townsley et al. | 395/182.12 |
| 5,666,337 A | * | 9/1997 | Dang et al. | 369/30.66 |
| 5,841,257 A | | 11/1998 | Hashimoto et al. | 318/568.11 |
| 6,012,119 A | * | 1/2000 | Ninomiya et al. | 710/305 |
| 6,356,803 B1 | * | 3/2002 | Goodman et al. | 700/218 |

* cited by examiner

Primary Examiner—Gregory J. Toatley, Jr.
Assistant Examiner—Sharon A. Polk
(74) Attorney, Agent, or Firm—Edmund Paul Pfleger

(57) ABSTRACT

A power limiting system and method are provided for limiting power delivered to a common bus in a one or multi-frame tape library environment. The system includes one or more frames coupled to a common bus, each of which is capable of delivering power to the common bus. Each frame comprises current limiting circuitry to limit the power delivered by that frame to the common bus. In exemplary embodiments, the current limiting circuitry of each frame includes a current limiting resistor and a blocking diode coupled to a local power source to limit the power delivered by that frame and to prevent feedback respectively. Additionally, each frame of the system includes a relay capable of receiving a limited power from the common bus, being energized, and, consequently, providing for the respective frame to be powered by a main power supply. In exemplary embodiments, each frame includes a switch for taking power from the common bus to power a frame only when a respective local power source is on and a respective frame is energized. The method provided includes a method for coupling additional frames to a power limited common bus by limiting the power delivered by each frame. Specifically, the method provides for only those frames, which are delivering power to the common bus, to be powered by the power available on the common bus.

20 Claims, 2 Drawing Sheets

FRAME 1   FRAME N-1   FRAME N

POWER LIMITING SYSTEM AND METHOD IN A MULTIPLE POWER SOURCE ENVIRONMENT

BACKGROUND OF THE INVENTION

1. Field of the Invention

The present invention relates to a power limiting system and method for limiting power delivered to a common bus in, for example, a one or multi-frame tape library environment. In particular, the present invention relates to a power limiting system and method where each frame is capable of delivering a limited power to a common bus, and where power delivered to the common bus is used to energize a relay in each frame. For each frame that is delivering a limited power to the common bus, a respective energized relay provides for the frame to be powered. A particular utility for the present invention is in a multi-frame tape library system, such as IBM 3584, where a large number of frames, e.g., 20 frames, may be desired but the total power supplied to a common bus must be limited to a predetermined level, e.g., 240 VA.

2. Description of Related Art

Conventional modular multi-frame tape library systems such as the IBM 3494 comprise a plurality of frames coupled together to form a tape library, for example, in a daisy-chain fashion. One switch controls a bank of relays, which, in turn, activates a frame. Typically, each frame includes the necessary hardware and software to operate those components of that frame which may include a plurality of tapes, a plurality of tape drive mechanisms for reading and writing data to tapes, and one or more controllable robot members to move tapes to and from tape drive mechanisms. The details of the tapes, tape drives, and robotic members are not important for an understanding of the present invention.

Additionally, for safety reasons, the total power supplied by all the frames should be limited to a predetermined power limit, e.g., 240 VA. Therefore, when a large number of frames, e.g., 20 frames, is added together in such systems, it is desirable for methodology in place to limit the total power supplied by the frames. Conventional techniques of limiting the total power supplied include the use of a plurality of fuses or semiconductor current limiting devices such that any point on the bus has current limiting protection which limits the available power to less than the predetermined limit. However, such techniques have some drawbacks. Fuses often have connection problems and must be replaced when they blow. Semiconductor current limiting devices are more expensive and may require more components. Both fuses and semiconductor current limiting devices add resistance to the bus wiring which affects the operation and the number of frames that can be added to the library.

Another conventional technique for limiting the total power supplied to the common bus is to separately control power delivery to each frame with an individual EPO (Emergency Power-Off) switch. With an increasing number of frames, separate EPO switches would increase the number of components required and the associate cost. Yet another conventional technique is to control power delivery to each frame using one large multi-pole EPO switch. A single multi-pole EPO switch would require additional wiring and would limit the number of frames to the number of poles of the switch.

SUMMARY OF THE INVENTION

The present invention provides a power limiting system and method for limiting power delivered by each of one or more frames to a common bus.

In an exemplary embodiment, the present invention provides a power limiting system comprising one or more frames coupled to a common bus. Each frame comprises a local DC power source coupled to current limiting circuitry. When coupled to the common bus, each frame is capable of utilizing the local power source and the current limiting circuitry to supply a limited power to the common bus.

In one embodiment, each frame further includes a relay capable of receiving power from the common bus, and capable of being energized upon receiving power from the common bus. For a frame whose local power source is on and respective relay is energized, the power limiting system of this embodiment provides for a main AC power supply to power the frame. In yet another embodiment, each frame includes a switch providing for the main AC power to power the frame when the frame's local power source is on and respective relay is energized.

In another embodiment, the current limiting circuitry of each frame comprises a current limiting resistor. In yet another embodiment, each current limiting resistor is selectable to cause the power supplied by the respective frame to at least equal the power needed to energize a respective relay. In a further embodiment, each frame coupled to the common bus includes a blocking diode disposed between the current limiting circuitry and common bus to prevent feedback.

In method form, the present invention provides a method of limiting the power delivered by a frame to a common bus. In one embodiment, the present invention provides a method of limiting the power delivered by each of one or more frames to a common bus, such that a greater number of frames may be coupled to the common bus. In yet another embodiment, the present invention provides a method of powering only those frames, coupled to the common bus, whose local power sources are on. In a further embodiment, the present invention provides a method of energizing a relay in each frame utilizing the power supplied by that frame. In this embodiment, the present invention further provides a method of utilizing each energized relay to provide for a main AC power to power a respective frame whose local power source is on.

It will be appreciated by those skilled in the art that although the following Detailed Description will proceed with reference being made to exemplary embodiments and methods of use, the present invention is not intended to be limited to these exemplary embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE EXEMPLARY EMBODIMENTS

Figure 1:
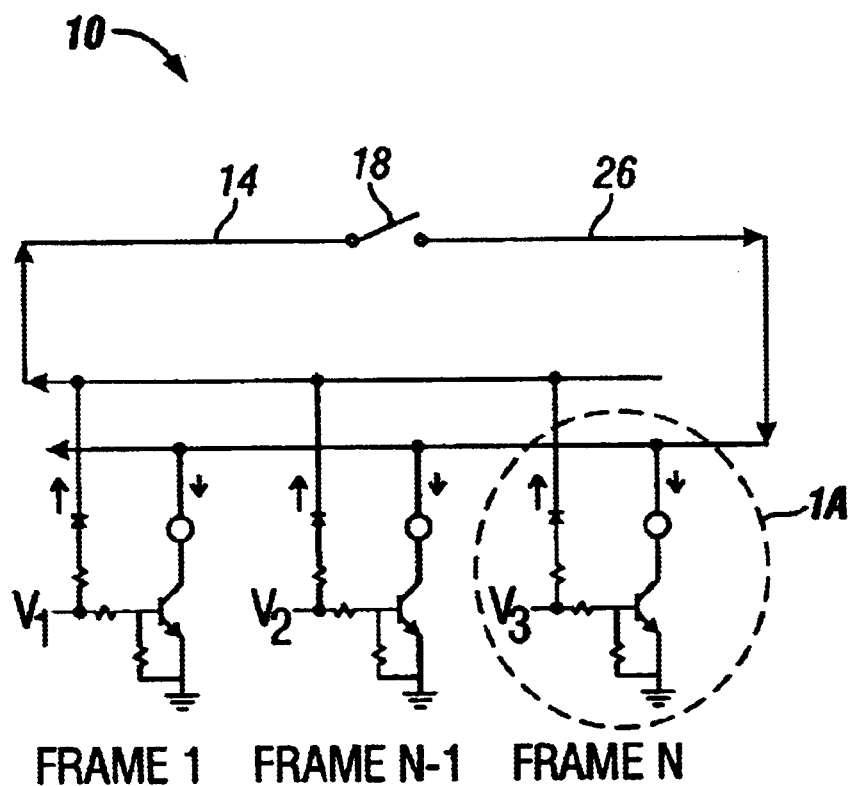
FIG. 1 is a circuit diagram of an exemplary power limiting system of the present invention.

FIG. 1 is a circuit diagram of an exemplary power limiting system 10 of the present invention. System 10 comprises a plurality of frames, for example, Frame 1, . . . Frame N−1, Frame N, coupled to a common bus 14. Generally system 10 limits the power delivered to the common bus 14 by each frame. Consequently, system 10 allows for a greater number of frames to be coupled to the common bus 14 without exceeding a predetermined power limit of the bus 14.

Figure 1A:
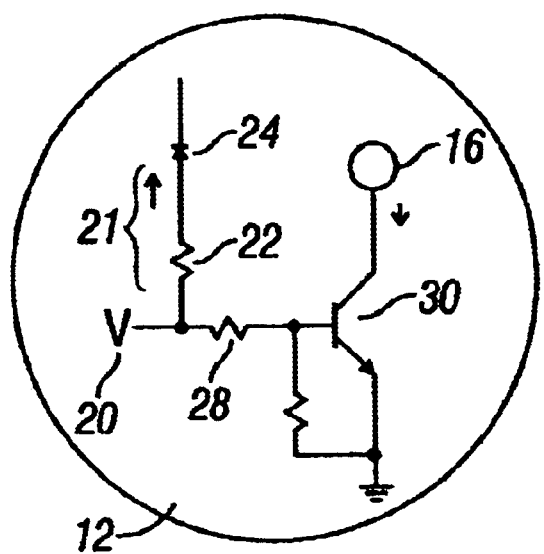
FIG. 1a is a circuit diagram of an exemplary frame of power limiting system.

FIG. 1a is a circuit diagram of an exemplary frame 12 of system 10. Where the following discussion refers to frame 12, the discussion also pertains to each of Frame 1 to Frame N, unless indicated otherwise. When coupled to the common bus 14, frame 12 utilizes a local power source 20 to supply power to the bus 14. In the exemplary embodiment, power source 20 is a DC voltage source. The power supplied by frame 12 is limited by coupling power limiting circuitry 21 between the power source 20 and the common bus 14. In one embodiment, the power limiting circuitry 21 comprises a resistor 22. Resistor 22 is of a power rating sufficient to sustain a short circuit. In an exemplary embodiment, frame 12 also utilizes a blocking diode 24 between the power source 20 and the output 21 to common bus 14 to prevent feedback. By limiting the power supplied by frame 12 to bus 14, system 10 allows for the addition of a greater number of frames without exceeding the aforementioned predetermined power limit of bus 14.

In an exemplary embodiment, when a frame 12 delivers power to bus 14, system 10 provides for that same power to be utilized to power frame 12 with a main AC power. This is done as follows. When frame 12 delivers power to bus 14, EPO switch 18 couples bus 14 to an EPO bus 26. In an alternative embodiment, a power limiting system may comprise a plurality of EPO switches to couple bus 14 to EPO bus 26. In one alternative embodiment, the power limiting system may comprise a plurality of EPO switches (not shown) utilized in series, whereby each switch of the plurality of switches may be turned on or off individually or simultaneously as desired. In the exemplary embodiment, EPO bus 26 is coupled to a relay 16 in frame 12. Bus 26 energizes relay 16. If relay 16 is energized and if power source 20 of frame 12 is on, then system 10 provides for the application of main AC power to power frame 12. This is discussed below.

Frame 12 comprises a switch 30 coupled to relay 16. Switch 30 decouples relay 16 from bus 26 if the local power source 20 is off. In the exemplary embodiment, switch 30 is an NPN transistor. In an alternative embodiment, switch 30 may by a PNP transistor or other type of switch device. In the exemplary embodiment, switch 30 is triggered by the power source 20, which provides a gate signal via resistor 28. That is, if power source 20 is on, switch 30 allows relay 16 to energize which applies main power from a main power supply (not shown) as described above. In the 3584 system, for example, relay 16 couples main DC power to a frame processor, which in turn may control activation of an AC power source. However, if power source 20 is off, then switch 30 is open; consequently, frame 12 decouples relay 16 from bus 26.

Therefore, in an exemplary embodiment, the power received by common bus 14 from a plurality of frames is balanced with the power removed from bus 14 to energize the same plurality of frames. That is, the power delivered by each frame to bus 14 must be sufficient to energize its own relay 16. However, in order to limit the power delivered to bus 14, the power delivered by each frame 12 to bus 14 does not exceed the power required to energize its own relay 16 and an additional relay.

In an exemplary embodiment, each frame of the plurality of frames comprises an identical power source. In an alternative embodiment, one power source of one frame may deliver more power than another power source of another frame. In this embodiment, one or more current limiting resistor, of one or more frames, respectively, may be variable, thereby allowing for the power delivered by each frame to be limited as desired. In other alternative embodiment, further modifications may be made, such as, for example, a single DC source may energize a plurality of relays. This and other modifications are deemed within the spirit and scope of the present invention, and are only limited by the following claims.

Figure 2:
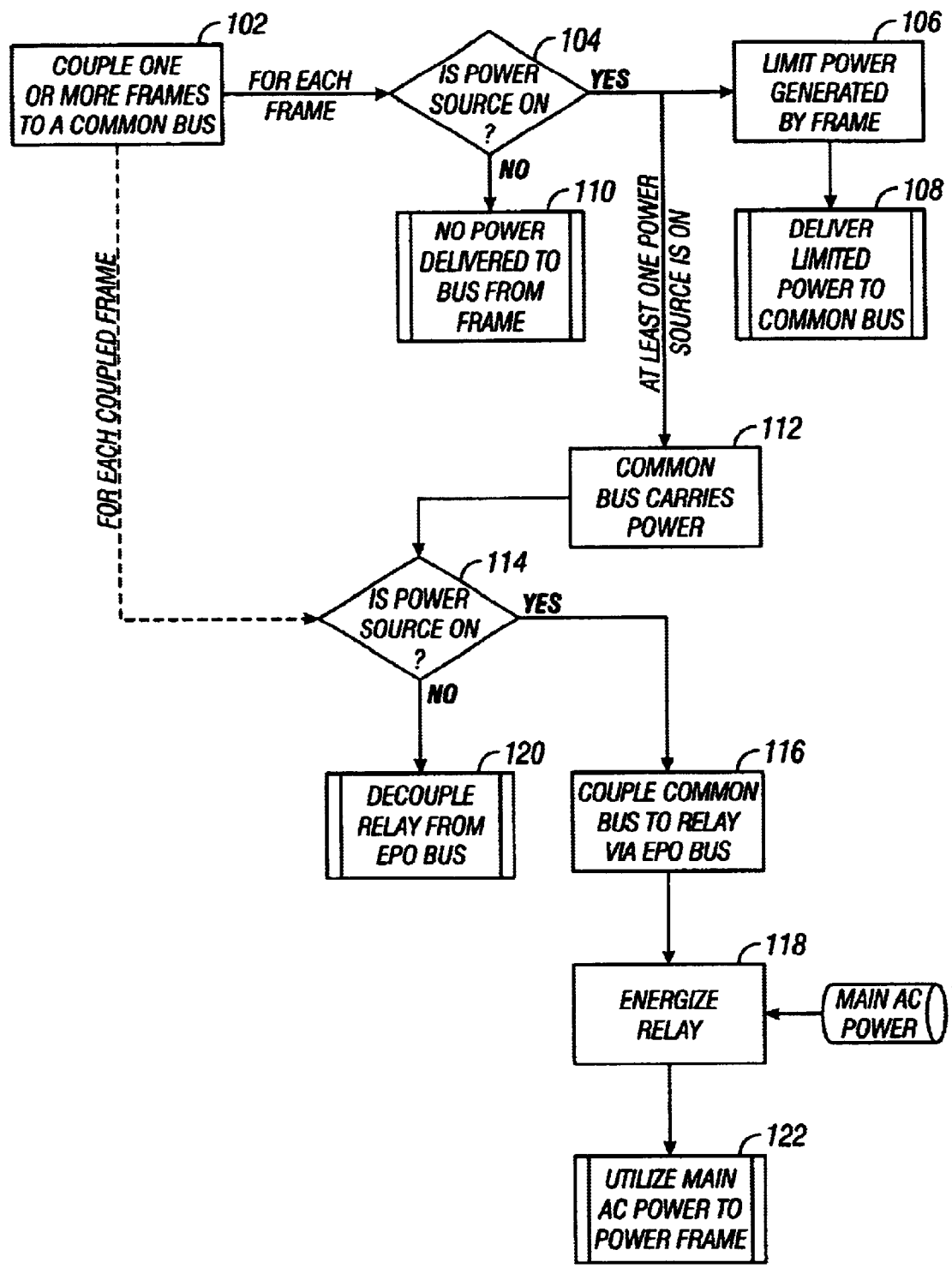
FIG. 2 depicts a flow chart of the overall process of limiting power delivered to a bus by one or more frames in an exemplary embodiment of the present invention.

FIG. 2 depicts a flow chart 100 of the overall process of limiting power delivered to a bus by one or more frames in an exemplary embodiment of the present invention. For clarity, reference numbers to the exemplary components depicted in FIG. 1 have been omitted. Initially, one or more frames are coupled to a common bus 102. For each frame, a determination is made as to whether the frame is on 104, that is, as to whether the local power source of that frame is live. If the frame is on, then, the power generated by the respective power source is limited by, for example, a current limiting resistor 106. The frame then delivers the limited power to the common bus 108. If the frame is off, that is, if the local power source is off, then no power is delivered to the bus by that frame 110.

If at least one frame is on, then a determination is made that the common bus carries power 112. If the common bus carries power, then, for each frame coupled to the common bus, a determination is made as to whether the respective power source is on 114. For each frame whose power source is on, a respective relay in that frame is coupled to the common bus via, in an exemplary embodiment, the aforementioned EPO bus 116. Consequently, the power carried by the common bus energizes the respective relay 118. In an exemplary embodiment, each relay that is energized provides for a main AC power to be utilized to power that frame 122. For each frame whose power source is off, the respective relay in that frame is decoupled from the common bus 120.

In the exemplary embodiment, frames may be turned on or off at any time. Further, frames may be coupled or decoupled from the common bus as desired. The limiting of power delivered by each coupled frame allows for a greater number of frames to be coupled to the common bus at one time. With the use of a relay to energize the library robotics for each frame, the exemplary embodiment provides for a limited power to be received by each frame, and for this limited power to cause the energizing of the respective library robotics. Modifications to the exemplary embodiment are deemed within the spirit and scope of the present invention, and are only limited by the following claims.

What is claimed is:

1. A power limiting system comprising
    a common bus;
    a frame coupled to said common bus, wherein said frame comprising power limiting circuitry for limiting power transmitted from said frame to said common bus; and at least one EPO switch for coupling said common bus to an EPO bus;
    wherein said frame further comprising a control relay for receiving power from said common bus, and wherein said power received from said common bus causing an energized state of said control relay.

2. A power limiting system as claimed in claim 1, wherein said frame comprising a local power source coupled to said power limiting circuitry for generating said power transmitted from said frame to said common bus.

3. A power limiting system as claimed in claim 1, wherein said control relay further comprising a control relay for receiving power from said EPO bus.

4. A power limiting system as claimed in claim 1, wherein said current limiting circuitry comprising a current limiting resistor.

5. A power limiting system as claimed in claim 4, wherein said current limiting resistor is selectable to cause said power transmitted by said frame to said common bus to be at least equal to a minimum power needed to cause said energized state of said control relay.

6. A power limiting system as claimed in claim 5, wherein said current limiting resistor is selectable to cause said power transmitted by said frame to said common bus to not exceed a power required to cause a first said energized state of a first said control relay of a first said frame and a second said energized state of a second said control relay of a second said frame.

7. A power limiting system as claimed in claim 1, wherein said frame further comprising a blocking diode for reducing feedback from said bus circuitry.

8. A power limiting system as claimed in claim 1, wherein said control relay providing for a main power to be coupled to said frame when said control relay is in said energized state and said frame is transmitting said power to said common bus.

9. A circuit as claimed in claim 8, wherein said frame further comprising a switch for allowing said main power to be coupled to said frame if said control relay is in said energized state and said frame is transmitting said power to said common bus.

10. A power limiting system comprising
   a common bus;
   a plurality of frames coupled to said common bus, wherein at least one frame of said plurality of frames comprising a local power source for delivering power to said common bus, and further comprising a control relay for receiving power from said common bus, wherein said power received from said common bus causing an energized state of said control relay;
   power limiting circuitry, comprised in said at least one frame of said plurality of frames, wherein said power limiting circuitry limits said power delivered by said power supply to said common bus; and at least one EPO switch for coupling said common bus to an EPO bus.

11. A power limiting system as claimed in claim 10, wherein said control relay further comprising a control relay for receiving power from said EPO bus.

12. A power limiting system as claimed in claim 10, wherein said current limiting circuitry comprising a current limiting resistor.

13. A power limiting system as claimed in claim 10, wherein said current limiting resistor is selectable to cause said power transmitted by said frame to said common bus to be at least equal to a minimum power needed to cause said energized state of said control relay.

14. A power limiting system as claimed in claim 13, wherein said current limiting resistor is selectable to cause said power transmitted by said frame to said common bus to not exceed a minimum power needed to cause a first said energized state of a first said control relay of a first said frame and a second said energized state of a second said control relay of a second said frame.

15. A power limiting system as claimed in claim 10, wherein said frame further comprising a blocking diode for reducing feedback from said bus circuitry.

16. A power limiting system as claimed in claim 10, wherein said control relay providing for a main power to be coupled to said frame when said control relay is in said energized state and said frame is transmitting said power to said common bus.

17. A circuit as claimed in claim 16, wherein said frame further comprising a switch for allowing said main power to be coupled to said common bus if said control relay is in said energized state and said frame is transmitting said power to said common bus.

18. A power limiting method comprising the steps of
   coupling a plurality of frames to a common bus, wherein each frame of said plurality of frames comprises a power source for transmitting power to said common bus and a relay for receiving power from said common bus;
   limiting power generated by each said power source to generate a limited power generated by each said frame;
   transmitting said limited power from each said frame to said common bus such that a total power transmitted to said common bus by said plurality of frames does not exceed a power safety limit of said common bus;
   coupling an EPO switch to said common bus, wherein said EPO switch couples said common bus to an EPO bus;
   coupling each said relay of each said frame of said plurality of frames to said EPO bus, wherein each said relay receiving power from said EPO bus;
   utilizing said power receive from said EPO bus to energize each said relay in each said frame of said plurality of frames.

19. A power limiting method as claimed in claim 18, wherein said step of limiting power generated by each said power source to generate a limited power generated by each said frame, farther comprising the steps of
   coupling a current limiting resistor between each said power source and said common bus;
   coupling a blocking diode between each said power source and said common bus to prevent feedback from said common bus.

20. A power limiting method as claimed in claim 18, further comprising the steps of
   coupling a main power supply to each said frame if a control relay in said frame is energized;
   utilizing a switch in each said frame, when said control relay in said frame is energized and said power source in said frame is on, to couple said main power to said frame.

* * * * *